United States Patent
Chu et al.

(10) Patent No.: US 11,459,634 B2
(45) Date of Patent: Oct. 4, 2022

(54) METHOD FOR MANUFACTURING STRESS-RELIEF-ANNEALING-RESISTANT, LOW-IRON-LOSS GRAIN-ORIENTED SILICON STEEL

(71) Applicant: BAOSHAN IRON & STEEL CO., LTD., Shanghai (CN)

(72) Inventors: Shuangjie Chu, Shanghai (CN); Guobao Li, Shanghai (CN); Yongjie Yang, Shanghai (CN); Zipeng Zhao, Shanghai (CN); Changsong Ma, Shanghai (CN); Kanyi Shen, Shanghai (CN); Meihong Wu, Shanghai (CN); Yaming Ji, Shanghai (CN); Huabing Zhang, Shanghai (CN); Zhuochao Hu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 9 days.

(21) Appl. No.: 16/963,334

(22) PCT Filed: Jun. 21, 2018

(86) PCT No.: PCT/CN2018/092077
§ 371 (c)(1),
(2) Date: Jul. 20, 2020

(87) PCT Pub. No.: WO2019/148742
PCT Pub. Date: Aug. 8, 2019

(65) Prior Publication Data
US 2020/0362433 A1    Nov. 19, 2020

(30) Foreign Application Priority Data
Jan. 31, 2018  (CN) .................. 201810095479.X

(51) Int. Cl.
*C21D 9/46* (2006.01)
*C21D 1/30* (2006.01)
(Continued)

(52) U.S. Cl.
CPC ............ *C21D 9/46* (2013.01); *B23K 26/0604* (2013.01); *B23K 26/0622* (2015.10);
(Continued)

(58) Field of Classification Search
CPC ............... B23K 26/06; B23K 26/0604; B23K 26/0608; B23K 26/0613; B23K 26/0617;
(Continued)

(56) References Cited

U.S. PATENT DOCUMENTS

| 4,535,218 A | * | 8/1985 | Krause | ................ B23K 26/073 |
| | | | | 219/121.68 |
| 4,904,312 A | | 2/1990 | Beckley et al. | |

(Continued)

FOREIGN PATENT DOCUMENTS

| CN | 102477484 A | 5/2012 |
| CN | 103097557 A | 5/2013 |

(Continued)

OTHER PUBLICATIONS

International Search Report dated Oct. 18, 2018 for corresponding PCT patent application No. PCT/CN2018/092077.

*Primary Examiner* — Vanessa T. Luk

(74) *Attorney, Agent, or Firm* — Amster, Rothstein & Ebenstein LLP

(57) ABSTRACT

Disclosed is a method for manufacturing stress-relief-annealing-resistant, low-iron-loss grain-oriented silicon steel, the method comprising: carrying out, by means of a pulse laser, scanning grooving on a single surface or two surfaces of a silicon steel sheet after cold rolling, or after decarburizing annealing, or after high temperature annealing or after (Continued)

hot stretching, temper rolling and annealing, and forming several grooves parallel with each other in a rolling direction of the silicon steel sheet, wherein a single pulse time width of the pulse laser is 100 ns or less, and a single pulse peak energy density is 0.05 J/cm² or more; the energy density of a single scan of a single laser beam is 1 J/cm² to 100 J/cm²; a beam spot of the pulse laser is a single beam spot or a combination of a plurality of beams spots, the shape of the beam spot is circular or elliptic, and the diameter of the beam spot in a scanning direction is 5 μm to 1 mm, and the diameter thereof in a direction perpendicular to the scanning direction is 5 μm to 300 μm; and when scanning grooving is carried out at the same position on the silicon steel sheet, the product of the number of beam spots of the pulse laser and the scan times is 5 or more.

5 Claims, 1 Drawing Sheet

(51) Int. Cl.
*C21D 8/12* (2006.01)
*B23K 26/0622* (2014.01)
*B23K 26/082* (2014.01)
*B23K 26/06* (2014.01)
*C22C 38/00* (2006.01)
*C22C 38/02* (2006.01)
*C22C 38/04* (2006.01)
*C22C 38/06* (2006.01)
*H01F 41/02* (2006.01)

(52) U.S. Cl.
CPC ............ *B23K 26/082* (2015.10); *C21D 1/30* (2013.01); *C21D 8/1222* (2013.01); *C21D 8/1233* (2013.01); *C21D 8/1255* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *H01F 41/02* (2013.01)

(58) Field of Classification Search
CPC ............ B23K 26/0619; B23K 26/062; B23K 26/0622; B23K 26/0624; B23K 26/0626; B23K 26/36; B23K 26/361; B23K 26/362; B23K 26/364; C21D 1/09; C21D 1/30; C21D 8/00; C21D 8/005; C21D 8/12; C21D 8/1205; C21D 8/1211; C21D 8/1216; C21D 8/1222; C21D 8/1227; C21D 8/1233; C21D 8/1238; C21D 8/1244; C21D 8/125; C21D 8/1255; C21D 8/1261; C21D 8/1266; C21D 8/1272; C21D 8/1277; C21D 8/1283; C21D 8/1288; C21D 8/1294; C21D 9/46; C21D 9/48; C21D 10/005
See application file for complete search history.

(56) References Cited

U.S. PATENT DOCUMENTS

| | | | |
|---|---|---|---|
| 5,296,051 A | 3/1994 | Inokuti et al. | |
| 2013/0183192 A1* | 7/2013 | Hill | C21D 8/0226 |
| | | | 420/103 |
| 2017/0298467 A1* | 10/2017 | Suehiro | C22C 38/00 |

FOREIGN PATENT DOCUMENTS

| | | | | | |
|---|---|---|---|---|---|
| CN | 106282512 | A | * | 1/2017 | |
| CN | 106282512 | A | | 1/2017 | |
| CN | 107502723 | A | | 12/2017 | |
| EP | 0870843 | A1 | | 10/1998 | |
| EP | 2554685 | A1 | | 2/2013 | |
| EP | 2599883 | A1 | | 6/2013 | |
| EP | 3205738 | A1 | | 8/2017 | |
| JP | H025821 | B2 | | 2/1990 | |
| JP | H06-57335 | A | | 3/1994 | |
| JP | 2013-541643 | A | | 11/2013 | |
| KR | 2016-0019919 | A | | 2/2016 | |
| KR | 20160019919 | A | | 2/2016 | |
| RU | 2499846 | C2 | | 11/2013 | |
| RU | 2580776 | C1 | | 4/2016 | |
| WO | 9724466 | A1 | | 7/1997 | |
| WO | 2012/014290 | A1 | | 2/2012 | |
| WO | 2011/125672 | A1 | | 7/2013 | |
| WO | 2012/033197 | A1 | | 1/2014 | |
| WO | WO-2016056501 | A | * | 4/2016 | ........... C22C 38/008 |
| WO | 2016/056501 | A1 | | 4/2017 | |
| WO | 2017206753 | A1 | | 12/2017 | |

* cited by examiner

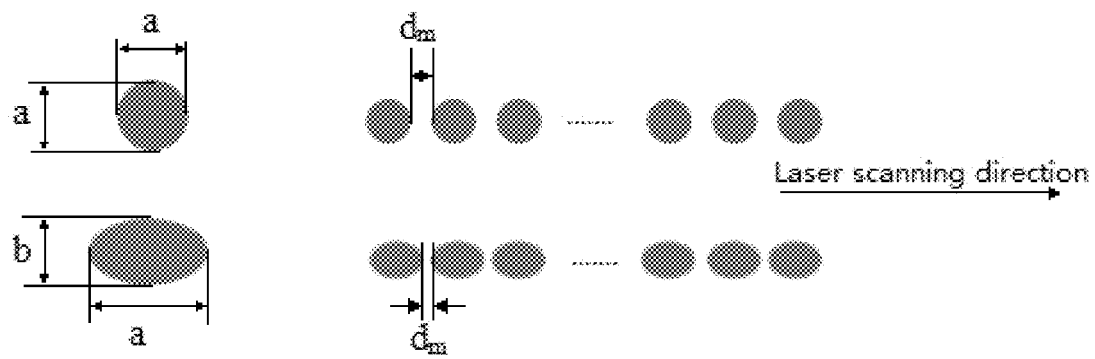

METHOD FOR MANUFACTURING STRESS-RELIEF-ANNEALING-RESISTANT, LOW-IRON-LOSS GRAIN-ORIENTED SILICON STEEL

TECHNICAL FIELD

The present invention relates to a method for manufacturing stress-relief-annealing-resistant, low-iron-loss grain-oriented silicon steel, and more particularly to a method for manufacturing stress-relief-annealing-resistant, laser-scoring grain-oriented silicon steel.

BACKGROUND ART

In recent years, global energy and environmental problems have become increasingly prominent, and the demand for energy saving and consumption reduction has been increasing. In 2011, the total losses during power transmission and distribution in China were about 287.4 billion kWh, of which the loss of the grain-oriented silicon steel transformer cores accounted for about 20% of the total loss. In light of this, the reduction of iron loss of grain-oriented silicon steel has huge economic and social benefits. In addition, transformer noise caused by magnetostriction and magnetic field line distortion of grain-oriented silicon steel has attracted much attention. Therefore, reducing the noise level of the transformer is also an important direction to improve the performance of grain-oriented silicon steel.

At present, the main methods to improve the iron loss and noise level of grain-oriented silicon steel are as follows:

1) Metallurgical method: optimize the composition and process parameters to obtain a perfect secondary recrystallization structure and improve the degree of orientation.

2) Tension control: improve the tension of the coating on the substrate surface, refine the magnetic domain, and reduce iron loss.

3) Scoring: use laser, mechanical, electron beam, plasma, chemical erosion and other means to score the silicon steel surface, and apply stress to refine the magnetic domains, thereby reducing iron loss.

At present, the orientation degree of grains of grain-oriented silicon steel has been raised to a relatively high level by metallurgical methods, and the average deviation angle of grain orientation in Hi-B steel is less than 5°. Therefore, the technique to improve the performance of grain-oriented silicon steel mainly focuses on the improvement of coating tension and scoring process.

Scoring on the surface of grain-oriented silicon steel can refine magnetic domains, thereby reducing iron loss. Generally, the scoring technique can be divided into two categories. One type is the scoring technique that is not resistant to stress-relief annealing, also known as non-heat-resistant scoring technique. In this technique, a linear thermal stress region is formed on the surface of the silicon steel sheet at a certain spacing by a laser, a plasma beam, an electron beam, or the like to cause sub-magnetic domains around the region, thereby reducing the width of the main magnetic domains and achieving the purpose of reducing iron loss. However, the refinement of magnetic domains by this technique disappears after stress-relief annealing. The products thus obtained are usually used to manufacture laminated iron core transformers that do not require annealing. The other type is the scoring technique that is resistant to stress-relief annealing, also known as heat-resistant scoring technique. The existing industrial technique mainly involves the formation of linear strain zones, i.e., linear grooves, on the surface of the grain-oriented silicon steel substrate by mechanical or electrochemical erosion, etc., to redistribute the magnetostatic energy of the system around the strain zone and reduce the width of the main magnetic domains. Thus, the reduction of iron loss is achieved. The refinement of magnetic domains does not deteriorate after stress-relief annealing, and the product thus obtained can be used to manufacture wound core transformers that require stress-relief annealing.

In the early days, heat-resistant scoring grain-oriented silicon steel products were usually produced by mechanical methods. For example, in the U.S. Pat. No. 4,770,720A, linear grooves are formed on the surface of the grain-oriented silicon steel by mechanical scoring such as gear rollers, so as to achieve heat-resistant scoring. However, the grain-oriented silicon steel substrate with a silicon content of about 3% and the magnesium silicate layer on the surface have extremely high hardness, and the gear rollers are easy to wear, resulting in uneven iron loss of the entire roll, and the production cost is extremely high, which is not conducive to mass production.

The method of using electrochemical, electron beam and ion beam corrosion to produce heat-resistant scoring products was also reported earlier. In the U.S. Pat. No. 7,063,780, electrolytic corrosion is used to form heat-resistant scoring grain-oriented silicon steel. First, the grain-oriented silicon steel sheet with an underlayer is linearly processed by a laser or the like to expose the metal substrate in the region. The grain-oriented silicon steel sheet is then immersed in the electrolyte to form an electrode pair between the silicon steel sheet and the electrode. The substrate is electrolytically etched by alternately controlling the positive and negative changes in the electrode potential so that the region forms linear grooves. In the U.S. Pat. No. 5,013,374, after the grooves are formed by laser, electron beam and electrochemical corrosion, etc., the grooves are filled with metal(s) such as Al that has a different thermal expansion coefficient from the silicon steel sheet substrate by electrophoresis or spray. After that, the silicon steel sheet substrate is cured and sintered at 650° C. The difference between the thermal expansion coefficients of the filler and the substrate results in the formation of stress in this linear region, and P17/50 can be reduced by 8-12%. However, the procedures and process control of the above two methods are extremely complicated, the manufacturing cost is high, and the processing speed is limited.

In the U.S. Pat. No. 5,146,063, the surface coating of the silicon steel is pressed into the metal substrate by electron beam to form linear strain, so as to achieve the purpose of refining magnetic domains. However, this method will form micro-protrusions on the other side of the silicon steel sheet, reduce the lamination coefficient of the silicon steel sheet, and easily lead to a decrease in the insulation performance of the steel sheet.

In recent years, the technique of producing heat-resistant scoring grain-oriented silicon steel products using laser methods has become a hot spot in research and development. In the U.S. Pat. No. 7,045,025, the surface of a silicon steel substrate before or after hot stretching, temper rolling and annealing is subjected to local linear heating using a laser beam to form a remelting zone. The coating material and a part of the metal substrate are melted, cooled, and solidified to form a melting zone. The magnetic properties of the finished product are controlled by the width and the depth of the remelting zone, thereby reducing the iron loss of the silicon steel sheet. In Chinese patent CN102834529, a continuous laser is used to engrave the groove. By controlling the scanning speed and power, the hot melting protrusions and the molten solidified layer are reduced, and the performance of grain-oriented silicon steel is improved.

However, the above laser heat-resistant scoring methods all use traditional continuous or pulsed lasers. Due to the high melting point and the fast heat conduction speed of steel, the methods of using traditional lasers to achieve heat-resistant scoring all result in different degrees of melt accumulation, and there may even be thermally deformation of the steel sheet and extremely low laser energy utilization efficiency. Moreover, the quality of the score is difficult to control, resulting in unstable magnetic properties of the product, and the improvement effect is greatly restricted.

The laser heat-resistant magnetic domain refinement techniques reported so far all use pulse laser light sources or continuous laser light sources. The principle of such technique is to use a high-energy beam laser to heat the steel plate to be the melting temperature or more, and thus melt the substrate metal and form splashing of fine molten metal droplets, or the substrate metal is directly heated to vaporize, thereby forming grooves on the surface of the silicon steel sheet. In the actual processing, since steel has a high melting temperature and a fast heat conduction speed, when the laser energy is sufficient to melt the steel and form the grooves, most of the laser energy is lost through the thermal conduction of the substrate metal, resulting in a large thermal diffusion zone and thermal stress zone formed on the substrate, which not only easily causes thermal deformation and warpage of the steel plate, but also may cause deterioration of magnetic properties. At the same time, the splashed metal droplets and residual slag are easily deposited on both sides of the grooves, resulting in uneven grooves, poor control stability of the groove shape, and thus unstable magnetic properties. The accumulated slag makes the edge protruding seriously, which not only causes the lamination coefficient of the silicon steel sheet to decrease significantly, but also has an adverse effect on the corrosion resistance and insulation performance of the silicon steel sheet.

SUMMARY OF THE INVENTION

An object of the present invention is to provide a method for manufacturing stress-relief-annealing-resistant, low-iron-loss grain-oriented silicon steel. The method overcomes the shortcomings of the existing laser heat-resistant scoring process, and greatly reduces the thermal influence, melt protrusion, and heat-affected zone during the laser scoring process, and there is no plate shape deterioration. The produced grain-oriented silicon steel sheet has a remarkable magnetic domain refinement effect, low iron loss and no reduction in lamination coefficients.

To achieve the above object, the technical solutions of the present invention are as follows.

A method for manufacturing stress-relief annealing resistant, low-iron-loss grain-oriented silicon steel, comprising: subjecting a silicon steel to iron smelting, steel smelting, continuous casting, hot rolling, single or double cold rolling, followed by decarburization annealing, coating a MgO-based separation agent on the surface of the steel, high-temperature annealing, finally, applying an insulating coating on the surface of the steel and performing hot stretching, temper rolling and annealing, thereby obtaining a finished product, wherein the method further comprising: carrying out, by means of a pulse laser, scanning grooving on a single surface or both surfaces of the resultant silicon steel sheet after cold rolling, or after decarburizing annealing, or after high temperature annealing or after hot stretching, temper rolling and annealing, and forming several grooves parallel with each other in a rolling direction of the silicon steel sheet;

wherein a single pulse time width of the pulse laser is 100 ns or less, and the peak energy density of a single pulse is 0.05 J/cm$^2$ or more; the energy density of a single laser beam in a single scan $E_s$ is 1 J/cm$^2$ to 100 J/cm$^2$;

beam spot(s) of the pulse laser is a single beam spot or a combination of a plurality of beams spots, the combination of a plurality of beams spots is composed of a plurality of beam spots linearly arranged along the scanning direction, the number of beam spots is 2~300; in the single beam spot or the combination of a plurality of beams spots, the shape of the beam spot(s) is/are circular or elliptic, and the diameter a of the beam spot(s) in a scanning direction is 5 µm to 1 mm, and the diameter b of the beam spot(s) in a direction perpendicular to the scanning direction is 5 µm to 300 µm; the average value of the spacing $d_m$ between the beam spots of the combination of a plurality of beams spots in the scanning direction is between c/5 and 5c, where c is the average diameter of the beam spots in the scanning direction; and when scanning grooving is carried out at the same position on the silicon steel sheet, the product of the number of beam spots of the pulse laser and the scan times is 5 or more.

Further, in the present invention, scanning grooving is performed on a single surface or both surfaces of the silicon steel sheet after hot stretching, temper rolling and annealing; after the grooving, silicon steel sheet is coated with secondary insulating coating(s) on one or both surfaces thereof and is then sintered.

In addition, the grooves formed on the surface of the silicon steel sheet of the present invention have a depth of 5 to 35 µm and a width of 8 to 310 µm. The height of the deposits formed by laser processing on both sides of the grooves is 2.5 µm or less, and the angle between the grooves and the lateral direction of the silicon steel sheet is 45° or less.

In the present invention, when a single surface of the grain-oriented silicon steel sheet is grooved, the spacing between adjacent grooves in the rolling direction of the silicon steel sheet is 1 to 10 mm. When both surfaces of the grain-oriented silicon steel sheet are grooved, the spacing between adjacent grooves in the rolling direction of the silicon steel sheet is 2 to 20 mm.

Preferably, the wavelength of the laser light wave is 0.3~3 µm.

The technical solutions of the present invention will be described in detail below.

Conventional grain-oriented silicon steel is formed into finished products through the following steps and then subcontracted for delivery: iron smelting, steel smelting, continuous casting, hot rolling, single or double cold rolling to the final thickness, and followed by decarburization annealing, coating a MgO-based separation agent on the surface, and high-temperature annealing to form a complete secondary recrystallization and magnesium silicate underlayer, and finally, coating an insulating coating on its surface and performing hot stretching, temper rolling and annealing. The invention is suitable for the manufacture of conventional grain-oriented silicon steel. The method of the invention utilizes instantaneous high-energy pulse laser to scan and form grooves on the surface of the silicon steel sheet. The groove processing can be performed before or after decarburization annealing, or before or after hot stretching, temper rolling and annealing. Grain-oriented silicon steel sheets or strips that are scored after hot stretching, temper rolling and annealing, may or may not be coated secondary insulating coating(s) and sintered after being grooved.

The inventors have found through research that, using a pulse laser with a small time width can increase the instantaneous energy, and effectively control the deformation of the steel plate caused by thermal melting and diffusion. Moreover, the shortening of the pulse time width can significantly reduce the thermal effect, thermal melting and metal splashing of the material. In the present invention, when the time width of a single laser pulse is 100 ns or less, the instantaneous pulse energy in the laser is greatly increased, the depth of the groove obtained by processing can be in the range of 5~35 μm, and the height of the deposits on both sides can be 2.5 μm or less, thereby obtaining grain-oriented silicon steel products with excellent magnetic properties and good lamination coefficients.

In the present invention, the wavelength of the pulse laser used is not limited, but preferably ranges from 0.3 to 3 μm. Within this preferred range, the laser absorption coefficient of the grain-oriented silicon steel material is relatively high, so that better processing efficiency can be obtained.

The peak energy density of a single pulse of the pulse laser used in the present invention is 0.05 J/cm² or more. This is because when the single pulse peak energy density of the pulse laser is less than 0.05 J/cm², the laser energy is too low, which results in extremely low grooving efficiency on the surface of grain-oriented silicon steel, and even may not form grooves, and it has no application value.

In the present invention, the laser beam spot used for processing may be a single beam spot or a combination of a plurality of beam spots. As shown in FIG. 1, in the single beam spot or the combination of a plurality of beams spots; the shape of the beam spot(s) is/are circular or elliptic; the diameter a of the circular beam spot and the diameter a of the elliptical beam spot in the laser scanning direction are in the range of 5 μm~1 mm, and the diameter b of the elliptical beam spot in a direction perpendicular to the laser scanning direction is 5 μm~300 μm; the combination of a plurality of beams spots is composed of a plurality of beam spots linearly arranged along the scanning direction, with the number of beam spots being 2 to 300; the average value of the spacing $d_m$ between the beam spots in the scanning direction in the combination of a plurality of beams spots formed on the surface of the steel plate is between c/5 and 5c, where c is the average diameter of the beam spots in the scanning direction. The spacing is limited to this range, so that the spacing of the laser beams brings cooling time to prevent the accumulation of melt on the surface of the material due to the excessively high temperature. In the present invention, when a groove size with an iron loss reduction effect is obtained, the mode of the single beam spot or the combination of a plurality of beams spots reduces the scan times of the laser and improves the laser scanning efficiency.

The inventors have found through research that, in order to prevent the formation of melt deposits on both sides of the groove, it is necessary to appropriately reduce the energy density of the single beam spot and achieve the desired depth of the groove through multiple scannings. The inventor determined the number of laser beam spots and the scan times through experiments, that is, when the scanning grooving is carried out at the same position on the steel sheet, the product of the number of laser beam spots and the scan times is 5 or more, which achieves the dual purpose of controlling the accumulation of melt and reducing the iron loss. When the product is less than 5, the purpose of reducing the iron loss can be achieved by increasing the laser energy, but the thermal melting phenomenon is serious. The melt accumulates on both sides of the grooves, greatly reducing the lamination coefficient of the silicon steel sheet. If the thermal melting is controlled by reducing the energy, the desired groove depth cannot be achieved, nor can the purpose of significantly refining the magnetic domains and reducing the iron loss of the silicon steel sheet be achieved.

For the instantaneous high-energy pulse laser source, the energy flux density of a single laser beam in a single scan $E_s$ is derived from the following formula:

$$E_s = \frac{a}{V_c} \square E_p \square f_r,$$

wherein $E_P$ is the peak energy density of a single pulse in the unit of J/cm², and has a relationship of:

$$E_p = \frac{P}{f_r \cdot S};$$

$f_r$ is the laser pulse repetition frequency in Hz; P is the laser output power in W; S is the laser beam spot area in cm²;

$V_c$ is the scanning speed of the laser beam in cm/s, and the scanning direction of the laser beam is roughly parallel to the lateral direction of the steel plate;

a is the diameter of the beam spot in the scanning direction, in cm.

In the present invention, the energy flux density of a single laser beam in a single scan $E_s$ is 1 J/cm² to 100 J/cm². When the energy flux density $E_s$ is not in the above range, serious thermal deposition occurs when the grooves are formed by laser ablation, resulting in melt accumulation at the edge of the grooves and the reduction of the lamination coefficient of the grain-oriented silicon steel sheet.

In the present invention, an instantaneous high-energy pulse laser is used to perform linear micromachining on a single surface or both surfaces of a silicon steel sheet to form grooves. The groove has a depth of 5~30 μm, and a width of 8~310 μm. When the depth of the groove is less than 5 μm or the width of the groove is less than 8 μm, the effect of scoring on the refinement of magnetic domains is not obvious, and the reduction of iron loss is limited. When the depth of the groove is more than 30 μm or the width is more than 310 μm, the magnetic flux leakage at the grooves is large, resulting in a decrease in magnetic induction, and multiple scans are needed for forming the desired groove size, that is, the laser scoring efficiency is low.

In the present invention, when a single surface of the grain-oriented silicon steel sheet is grooved, the spacing between adjacent grooves in the rolling direction is 1 to 10 mm. When both surfaces of the grain-oriented silicon steel sheet are grooved, the spacing between adjacent grooves in the rolling direction is 2 to 20 mm. In the case of laser scoring on a single surface of an grain-oriented silicon steel sheet, when the spacing between adjacent grooves in the rolling direction is less than 1 mm, the number of score lines is large, which significantly reduces the magnetic induction of the grain-oriented silicon steel sheet. When the spacing between adjacent grooves in the rolling direction is more than 10 mm, the refinement of the magnetic domain by the score lines is limited, and the reduction of iron loss is not obvious. In the case of laser scoring on both surfaces of an grain-oriented silicon steel sheet, when the spacing between adjacent grooves in the rolling direction is less than 2 mm or more than 20 mm, the above issues will also occur.

The Beneficial Effects of the Invention:

In the present invention, an instantaneous high-energy pulse laser source is used to perform non-hot-melt processing to form grooves, obtains heat-resistant scoring grain-oriented silicon steel with low iron loss, and greatly reduces the heat influence, the melt protrusion and the heat-affected zone during the groove processing. The edges of the scored grooves are flat, the height of the protrusions or deposits is small, and the plate shape is good. The magnetic domain refinement effect of the manufactured grain-oriented silicon steel sheet is remarkable, the iron loss is low and the lamination coefficient is maintained. Therefore, wound core transformers made of the grain-oriented silicon steel sheet have the characteristics of low loss and low noise.

In the present invention, an instantaneous high-energy pulse laser is used to score the grain-oriented silicon steel sheet, and the product of the number of laser beam spots and the scan times thereof is much more than that of existing laser scoring methods. The method of the invention not only greatly reduces the thermal effect and heat accumulation, ensures that the steel plate is not deformed, but also effectively controls the deposits and metal splashes on both sides of the groove. The height of deposits on both sides of the groove are controlled to 2.5 μm or less, ensuring that the lamination coefficient of grain-oriented silicon steel does not decrease, and and thus obtain better score quality and finished product performance with better laser energy efficiency. The produced grain-oriented silicon steel sheet has a remarkable magnetic domain refinement effect, low iron loss and no reduction in lamination coefficient.

BRIEF DESCRIPTION OF THE DRAWINGS

FIG. 1 is a schematic diagram of the single laser beam spot and the combination of a plurality of beams spots used in the present invention.

DETAILED DESCRIPTION

The present invention will be further described below with reference to Examples and drawings.

Example 1

The grain-oriented silicon steel was subjected to iron smelting, steel smelting and continuous casting to obtain a billet containing C: 0.07%, Si: 3.1%, Mn: 0.14%, Al: 0.020%, N: 0.01%, S: 0.01% in mass %. Then, the billet was subjected to hot rolling and single cold rolling to achieve a final thickness of 0.23 mm. After performing decarburization annealing to form a surface oxide layer, coating an annealing separation agent containing MgO as the main component on the surface, and high-temperature annealing at 1250° C. for 20 hours. After washing away the unreacted residual MgO, laser heat-resistant scoring was performed on a single surface of the steel plate. The parameters of laser scanning scoring were as follows: the laser pulse time width was 10 ns, the laser wavelength was 1066 nm, the repetition frequency was 800 KHz, the diameter b of the beam spot perpendicular to the scanning direction was 50 μm, the spacing $d_m$ between beam spots in a group of beam spots was 10 μm, and the number of beam spots was 5. The depth of the grooves formed by scoring was controlled to be 15-18 μm, and the width was controlled to be 50-55 μm. The angle between the groove and the lateral direction of the steel plate is 8°, and the spacing between adjacent grooves in the rolling direction is 4.5 mm. Table 1 shows the parameters of specific scoring process. After the scoring was completed, final annealing was performed to apply the tension coating.

Epstein 0.5 kg method in GB/T3655-2008 was used for magnetic measurement of the silicon steel sheets. GB/T19289-2003 was used to determine the lamination coefficient of the silicon steel sheets. The measurement results of Examples 1-10 and Comparative Examples 1-3 are shown in Table 2.

As can be seen from Tables 1 and 2, in Examples 1-10, as the peak energy density of a single pulse $E_p$ and the energy flux density of a single laser beam in a single scan $E_s$ are within the range defined by the present invention, the iron loss P17/50 of the silicon steel sheet after scoring is 0.75 W/kg or less, and the lamination coefficient remains 95% or more. In Comparative Examples 1 and 2, the energy flux density of a single laser beam in a single scan is outside the range of the present invention. Although the iron loss P17/50 is good in Comparative Examples 1 and 2, the lamination coefficient decreases significantly. In Comparative Example 3, the peak energy density of a single pulse is too low, which results in poor scoring effects (when the scan times reaches 30, the depth of the grooves formed by laser scoring is only 3.3 μm) and high iron loss, and thus it has no industrial value.

Example 2

The grain-oriented silicon steel was subjected to iron smelting, steel smelting and continuous casting to obtain a billet containing C: 0.05%, Si: 3.7%, Mn: 0.10%, Al: 0.03%, N: 0.016%, S: 0.013% in mass %. Then, the billet was subjected to hot rolling and single cold rolling to achieve a final thickness of 0.26 mm. After performing decarburization annealing to form a surface oxide layer, coating an annealing separation agent containing MgO as the main component on the surface, and performing high-temperature annealing at 1250° C. for 20 hours. After washing away the unreacted residual MgO, hot stretching, temper rolling and annealing was performed to apply a tension coating. After that, laser scoring was performed on both the upper and lower surfaces of the steel plate. The laser wavelength is 533 nm and the repetition frequency is 600 KHz. The pulse width, laser output power, beam spot size, beam spot combination, scanning speed, scan times and other parameters were adjusted to achieve the desired scoring effect. Table 3 shows the parameters of specific scoring process. The grooves are perpendicular to the rolling direction of the steel plate. The spacing between adjacent grooves in the rolling direction is 6 mm. After completing the scoring, the insulating coating was applied again and dried and sintered to form the final grain-oriented silicon steel sheet.

Epstein 0.5 kg method in GB/T3655-2008 was used for magnetic measurement of the silicon steel sheets. GB/T19289-2003 was used to determine the lamination coefficient of the silicon steel sheets. The measurement results of Examples 11-20 and Comparative Examples 4-12 are shown in Table 4.

As can be seen from Tables 3 and 4, in Examples 11-20, as the pulse width, beam spot size, parameters of the combination of beam spots, and the product of the number of beam spots and the scan times are all within the range of the present invention, the height of the protrusions on both sides of the groove formed by scoring is 2.5 μm or less, and the magnetic properties of the silicon steel sheet are good after stress-relief annealing. In Comparative Examples 4-12, as the above parameters are outside the range of the present invention, the height of the protrusions on both sides of the groove formed by the scoring is more than 2.5 µm, the magnetic induction or the lamination coefficient is significantly reduced.

Example 3

The grain-oriented silicon steel was subjected to iron smelting, steel smelting and continuous casting to obtain a billet containing C: 0.09%, Si: 2.9%, Mn: 0.12%, Al: 0.019%, N: 0.016%, S: 0.012% in mass %. Then, the billet was subjected to hot rolling and single cold rolling to achieve a final thickness of 0.22 mm. After performing decarburization annealing to form a surface oxide layer, linear microgrooves were scored on the surface of the steel plate using a pulse laser with a pulse time width of 0.5 nanoseconds. The output power of the laser was 100 W, the wavelength of the light wave was 533 nm, and the repetition frequency was 200 KHz. The beam spot focused on the surface of the steel plate was circular. The laser was a combination of multiple beam spots, and the number of beam spots was 20. The spacing between beam spots in the group of beam spots was 40 µm, and the laser scanning speed was 10 m/s. The scan times, scanning direction, and offset direction of scanning were adjusted to obtain different groove depth, width, and the angle between the score line and the lateral direction of the steel plate. Table 5 shows the parameters of specific scoring process.

The above samples were subjected to a decarburization annealing process at a temperature of 830° C. to form a surface oxide layer. Then, MgO separation agent was applied to the surface of the steel plate. After the steel plate was made into steel coils, it was kept under high temperature annealing conditions at 1200° C. for 20 hours. Finally, after washing away the residual MgO, an insulating coating was applied on the surface of the steel coil, and the final hot stretching, temper rolling and annealing was performed to obtain a finished silicon steel sheet.

Epstein 0.5 kg method in GB/T3655-2008 was used for magnetic measurement of the silicon steel sheets. GB/T19289-2003 was used to determine the lamination coefficient of the silicon steel sheets. The measurement results of Examples 21-30 and Comparative Examples 13-21 are shown in Table 6.

As can be seen from Tables 5 and 6, in Examples 21-30, as the groove parameters and the score line of the laser scoring are within the scope of the present invention, both the iron loss P17/50 and the magnetic induction B8 are good. On the other hand, in Comparative Examples 13-21, as the groove parameters and the score line of the laser scoring are outside the range of the present invention, P17/50 is too high or B8 is obviously low.

In summary, the present invention uses instantaneous high-energy laser to score the silicon steel surface. The method of the invention has the advantages of high processing efficiency and good scoring effect, and is particularly suitable for the manufacture of high-efficiency coiled iron core transformers, which can effectively save the power loss caused by transmission and distribution in the power grid and has good applicability.

TABLE 1

| | Laser power (W) | Diameter a of beam spot(s) in scanning direction (µm) | Diameter b of beam spot(s) in a direction perpendicular to scanning direction (µm) | Scan speed $V_c$ (cm/s) | Scan times | Peak energy density of single pulse $E_p$ (J/cm$^2$) | Energy flux density of a single laser beam in a single scan $E_s$ (J/cm$^2$) | Number of beam spots × Scan times | Groove depth (µm) | Groove width (µm) | Height of protrusions on both sides of grooves (µm) |
|---|---|---|---|---|---|---|---|---|---|---|---|
| Example 1 | 10 | 500 | 50 | 1000 | 10 | 0.06 | 2.5 | 50 | 17.6 | 51.8 | 0 |
| Example 2 | 20 | 200 | 50 | 1000 | 8 | 0.32 | 5.1 | 40 | 16.8 | 52.1 | 0 |
| Example 3 | 100 | 100 | 50 | 1000 | 2 | 3.18 | 25.5 | 10 | 16.9 | 53.8 | 1.1 |
| Example 4 | 100 | 50 | 50 | 1000 | 2 | 6.37 | 25.5 | 10 | 15.9 | 54.3 | 1 |
| Example 5 | 390 | 50 | 50 | 1000 | 1 | 24.83 | 99.3 | 5 | 16.7 | 53.9 | 1.8 |
| Example 6 | 20 | 200 | 50 | 1000 | 8 | 0.32 | 5.1 | 40 | 17.2 | 52.8 | 0 |
| Example 7 | 100 | 100 | 50 | 1000 | 2 | 3.18 | 25.5 | 10 | 15.9 | 53.1 | 0 |
| Example 8 | 100 | 50 | 50 | 1000 | 2 | 6.37 | 25.5 | 10 | 16.3 | 52.2 | 0.6 |
| Example 9 | 390 | 50 | 50 | 1000 | 1 | 24.83 | 99.3 | 5 | 16.8 | 53.8 | 0.8 |
| Example 10 | 40 | 50 | 50 | 10000 | 10 | 2.55 | 1.0 | 50 | 16.2 | 54.3 | 2.1 |
| Comparative Example 1 | 40 | 50 | 50 | 11000 | 15 | 2.55 | 0.9 | 75 | 15.9 | 57.9 | 2.7 |
| Comparative Example 2 | 400 | 50 | 50 | 1000 | 1 | 25.46 | 101.9 | 5 | 17.3 | 59.2 | 2.6 |
| Comparative Example 3 | 7 | 500 | 50 | 1000 | 30 | 0.04 | 1.8 | 150 | 3.3 | 50.6 | 0 |

TABLE 2

| | Magnetic properties of silicon steel sheets after stress-relief annealing | | |
|---|---|---|---|
| | P17/50 (W/kg) | B8 (T) | Lamination coefficient (%) |
| Example 1 | 0.735 | 1.912 | 97.3 |
| Example 2 | 0.748 | 1.909 | 97.5 |
| Example 3 | 0.736 | 1.907 | 96.5 |

TABLE 2-continued

Magnetic properties of silicon steel sheets after stress-relief annealing

|  | P17/50 (W/kg) | B8 (T) | Lamination coefficient (%) |
|---|---|---|---|
| Example 4 | 0.742 | 1.91 | 96.2 |
| Example 5 | 0.729 | 1.908 | 95.9 |
| Example 6 | 0.75 | 1.914 | 96.8 |
| Example 7 | 0.741 | 1.909 | 97.6 |
| Example 8 | 0.733 | 1.909 | 97.2 |
| Example 9 | 0.746 | 1.911 | 96.9 |
| Example 10 | 0.748 | 1.908 | 95.4 |
| Comparative Example 1 | 0.763 | 1.901 | 93.8 |
| Comparative Example 2 | 0.742 | 1.905 | 94.2 |
| Comparative Example 3 | 0.886 | 1.92 | 97.5 |

TABLE 3

|  | Pulse Width (ns) | Laser power (W) | Beam spot size Diameter a in scanning direction (μm) | Beam spot size Diameter b in a direction perpendicular to scanning direction (μm) | Parameters of the combination of beam spots Number of beam spots | Parameters of the combination of beam spots Spacing between beam spots (μm) | Scan speed (cm/s) | Scan times | Peak energy density of single pulse $E_p$ (J/cm²) | Energy flux density of a single laser beam in a single scan $E_s$ (J/cm²) | Number of beam spots × Scan times | Groove depth (μm) | Groove width (μm) | Height of protrusions on both sides of grooves (μm) |
|---|---|---|---|---|---|---|---|---|---|---|---|---|---|---|
| Example 11 | 40 | 100 | 15 | 15 | 5 | 20 | 1000 | 4 | 94.3 | 84.9 | 20 | 20.5 | 26.6 | 0.5 |
| Example 12 | 40 | 100 | 15 | 15 | 5 | 20 | 1000 | 1 | 94.3 | 84.9 | 5 | 19.5 | 22.7 | 1.5 |
| Example 13 | 40 | 100 | 15 | 15 | 5 | 3 | 1000 | 2 | 94.3 | 84.9 | 10 | 19.7 | 22.6 | 1.6 |
| Example 14 | 40 | 100 | 15 | 15 | 1 |  | 1000 | 8 | 94.3 | 84.9 | 8 | 19.6 | 29.9 | 0.9 |
| Example 15 | 40 | 100 | 15 | 80 | 300 | 80 | 1000 | 1 | 17.7 | 84.9 | 300 | 21.5 | 23.6 | 1.2 |
| Example 16 | 0.5 | 100 | 100 | 5 | 5 | 100 | 1000 | 2 | 42.4 | 12.7 | 10 | 20.5 | 106.5 | 2.1 |
| Example 17 | 0.5 | 2000 | 100 | 1000 | 5 | 100 | 10000 | 2 | 4.2 | 25.5 | 10 | 21.3 | 106.7 | 0.9 |
| Example 18 | 0.5 | 100 | 5 | 50 | 100 | 35 | 5000 | 2 | 84.9 | 50.9 | 200 | 21.7 | 33.4 | 1.5 |
| Example 19 | 0.5 | 1000 | 300 | 300 | 2 | 100 | 1000 | 10 | 2.4 | 42.4 | 20 | 19.8 | 307.3 | 1.8 |
| Example 20 | 100 | 100 | 15 | 15 | 2 | 20 | 1000 | 4 | 94.3 | 84.9 | 8 | 21.3 | 26.4 | 1 |
| Comparative Example 4 | 40 | 100 | 15 | 15 | 1 |  | 1000 | 4 | 94.3 | 84.9 | 4 | 19.8 | 30.1 | 3 |
| Comparative Example 5 | 40 | 100 | 15 | 15 | 4 | 2.5 | 1000 | 5 | 94.3 | 84.9 | 20 | 20.9 | 33.2 | 2.9 |
| Comparative Example 6 | 40 | 100 | 15 | 15 | 4 | 76 | 1000 | 5 | 94.3 | 84.9 | 20 | 19.5 | 26.6 | 2.5 |
| Comparative Example 7 | 40 | 100 | 15 | 80 | 301 | 80 | 1000 | 1 | 17.7 | 84.9 | 301 | 19.5 | 29.3 | 3.6 |
| Comparative Example 8 | 0.5 | 100 | 100 | 4.5 | 3 | 20 | 1000 | 10 | 47.2 | 12.7 | 30 | 19.8 | 106.6 | 2.8 |
| Comparative Example 9 | 0.5 | 2000 | 100 | 1010 | 3 | 100 | 10000 | 10 | 4.2 | 25.5 | 30 | 21.8 | 106.1 | 2.7 |
| Comparative Example 10 | 0.5 | 100 | 4.5 | 50 | 3 | 35 | 10000 | 10 | 94.3 | 28.3 | 30 | 21.6 | 22.6 | 3.1 |
| Comparative Example 11 | 0.5 | 1000 | 301 | 400 | 50 | 35 | 10000 | 2 | 1.8 | 4.2 | 100 | 21.9 | 306.4 | 3.1 |
| Comparative Example 12 | 102 | 100 | 15 | 15 | 2 | 20 | 1000 | 4 | 94.3 | 84.9 | 8 | 20.2 | 28.3 | 3.2 |

TABLE 4

Magnetic properties of silicon steel sheets after stress-relief annealing

|  | P17/50 (W/kg) | B8 (T) | Lamination coefficient (%) |
|---|---|---|---|
| Example 11 | 0.853 | 1.912 | 97.5 |
| Example 12 | 0.867 | 1.909 | 97.0 |
| Example 13 | 0.887 | 1.911 | 96.9 |
| Example 14 | 0.870 | 1.908 | 96.8 |
| Example 15 | 0.866 | 1.909 | 96.5 |

TABLE 4-continued

Magnetic properties of silicon steel sheets after stress-relief annealing

|  | P17/50 (W/kg) | B8 (T) | Lamination coefficient (%) |
|---|---|---|---|
| Example 16 | 0.846 | 1.905 | 96.5 |
| Example 17 | 0.850 | 1.905 | 96.8 |
| Example 18 | 0.868 | 1.903 | 96.2 |
| Example 19 | 0.849 | 1.912 | 96.6 |
| Example 20 | 0.857 | 1.909 | 97.1 |
| Comparative Example 4 | 0.866 | 1.901 | 95.4 |
| Comparative Example 5 | 0.868 | 1.903 | 95.6 |
| Comparative Example 6 | 0.872 | 1.907 | 95.8 |
| Comparative Example 7 | 0.874 | 1.911 | 94.3 |
| Comparative Example 8 | 0.864 | 1.903 | 93.9 |
| Comparative Example 9 | 0.879 | 1.905 | 95.0 |
| Comparative Example 10 | 0.857 | 1.908 | 94.9 |
| Comparative Example 11 | 0.833 | 1.897 | 95.6 |
| Comparative Example 12 | 0.883 | 1.91 | 94.6 |

TABLE 5

|  | Laser power (W) | Scored surface | Beam spot size | | Scan times | Peak energy density of single pulse Ep (J/cm$^2$) | Energy flux density of a single laser beam in a single scan Es (J/cm$^2$) | Number of beam spots × Scan times | Groove depth (μm) | Groove width (μm) | Spacing between adjacent grooves in rolling direction (μm) | Angle between the grooves and lateral direction of steel plate (°) | Height of protrusions on both sides of groove (μm) |
|---|---|---|---|---|---|---|---|---|---|---|---|---|---|
|  |  |  | Diameter a in scanning direction (μm) | Diameter b in a direction perpendicular to scanning direction (μm) |  |  |  |  |  |  |  |  |  |
| Example 21 | 100 | Single | 40 | 40 | 8 | 39.8 | 31.8 | 160 | 22.3 | 45.6 | 5 | 6 | 0.5 |
| Example 22 | 10 | Single | 5 | 8 | 2 | 159.2 | 25.5 | 40 | 5 | 12 | 5 | 6 | 0 |
| Example 23 | 100 | Single | 40 | 40 | 15 | 39.8 | 31.8 | 300 | 35 | 46.3 | 5 | 6 | 0.6 |
| Example 24 | 10 | Single | 5 | 8 | 4 | 159.2 | 25.5 | 80 | 6 | 8 | 5 | 6 | 0 |
| Example 25 | 100 | Single | 40 | 40 | 18 | 39.8 | 31.8 | 360 | 23.1 | 310 | 5 | 6 | 0.2 |
| Example 26 | 100 | Single | 40 | 40 | 8 | 39.8 | 31.8 | 160 | 22.8 | 46.2 | 1 | 6 | 0.2 |
| Example 27 | 100 | Single | 40 | 40 | 8 | 39.8 | 31.8 | 160 | 21.9 | 44.7 | 10 | 6 | 0.7 |
| Example 28 | 100 | Single | 40 | 40 | 8 | 39.8 | 31.8 | 160 | 22 | 43.9 | 4.5 | 45 | 0.3 |
| Example 29 | 100 | Both | 40 | 40 | 6 | 39.8 | 31.8 | 120 | 17.6 | 42.8 | 2 | 6 | 0.8 |
| Example 30 | 100 | Both | 40 | 40 | 6 | 39.8 | 31.8 | 120 | 16.9 | 43.3 | 20 | 6 | 0.2 |
| Comparative Example 13 | 10 | Single | 4.5 | 8 | 2 | 176.8 | 28.3 | 40 | 4.8 | 12.4 | 5 | 6 | 0 |
| Comparative Example 14 | 100 | Single | 36 | 40 | 16 | 44.2 | 35.4 | 320 | 35.5 | 42.2 | 5 | 6 | 0.5 |
| Comparative Example 15 | 10 | Single | 5 | 8 | 2 | 159.2 | 25.5 | 40 | 6.3 | 7.8 | 5 | 6 | 0 |
| Comparative Example 16 | 100 | Single | 40 | 40 | 18 | 39.8 | 31.8 | 360 | 21.6 | 312 | 5 | 6 | 0.3 |
| Comparative Example 17 | 100 | Single | 40 | 40 | 8 | 39.8 | 31.8 | 160 | 20.9 | 44.8 | 0.9 | 6 | 0.3 |
| Comparative Example 18 | 100 | Single | 40 | 40 | 8 | 39.8 | 31.8 | 160 | 22.8 | 43.3 | 10.2 | 6 | 0.4 |
| Comparative Example 19 | 100 | Single | 40 | 40 | 8 | 39.8 | 31.8 | 160 | 23.3 | 42.1 | 4.5 | 46 | 0.6 |
| Comparative Example 20 | 100 | Both | 40 | 40 | 6 | 39.8 | 31.8 | 120 | 17.3 | 43.3 | 1.9 | 6 | 0.4 |
| Comparative Example 21 | 100 | Both | 40 | 40 | 6 | 39.8 | 31.8 | 120 | 18.2 | 42.9 | 20.5 | 6 | 0.4 |

TABLE 6

Magnetic properties of silicon steel sheets after stress-relief annealing

|  | P17/50 (W/kg) | B8 (T) | Lamination coefficient (%) |
|---|---|---|---|
| Example 21 | 0.756 | 1.916 | 97.5 |
| Example 22 | 0.785 | 1.923 | 97.6 |

TABLE 6-continued

Magnetic properties of silicon steel sheets after stress-relief annealing

|  | P17/50 (W/kg) | B8 (T) | Lamination coefficient (%) |
|---|---|---|---|
| Example 23 | 0.753 | 1.902 | 96.6 |
| Example 24 | 0.782 | 1.920 | 97.3 |
| Example 25 | 0.756 | 1.901 | 96.6 |
| Example 26 | 0.756 | 1.900 | 96.4 |
| Example 27 | 0.778 | 1.918 | 97.1 |
| Example 28 | 0.759 | 1.909 | 97.7 |
| Example 29 | 0.748 | 1.900 | 96.5 |
| Example 30 | 0.788 | 1.921 | 97.1 |
| Comparative Example 13 | 0.802 | 1.918 | 96.9 |
| Comparative Example 14 | 0.751 | 1.894 | 96.4 |
| Comparative Example 15 | 0.811 | 1.923 | 96.9 |
| Comparative Example 16 | 0.772 | 1.894 | 96.4 |
| Comparative Example 17 | 0.746 | 1.894 | 96.5 |
| Comparative Example 18 | 0.809 | 1.917 | 97.1 |
| Comparative Example 19 | 0.805 | 1.903 | 96.9 |
| Comparative Example 20 | 0.748 | 1.890 | 97.0 |
| Comparative Example 21 | 0.825 | 1.923 | 97.0 |

The invention claimed is:

1. A method for manufacturing stress-relief-annealing-resistant, low-iron-loss grain-oriented silicon steel, comprising:

subjecting silicon steel to iron smelting, steel smelting, continuous casting, hot rolling, single or double cold rolling, followed by decarburization annealing, coating a MgO-based separation agent on a surface of the steel, high-temperature annealing, and finally, applying an insulating coating on the surface of the steel and performing hot stretching, temper rolling and annealing, thereby obtaining a finished product;

carrying out, by means of pulse laser, scanning grooving on a single surface or both surfaces of the resultant silicon steel sheet after cold rolling, or after decarburizing annealing, or after high temperature annealing or after hot stretching, temper rolling and annealing, and forming grooves parallel with each other in a rolling direction of the silicon steel sheet;

wherein a single pulse time width of the pulse laser is 100 ns or less, and a peak energy density of a single pulse is 0.05 J/cm$^2$ or more; the energy density of a single laser beam in a single scan $E_s$, is 1 J/cm$^2$ to 100 J/cm$^2$;

wherein beam spot(s) of the pulse laser is a single beam spot or a combination of a plurality of beams spots, the combination of the plurality of beams spots is composed of a plurality of beam spots linearly arranged along a scanning direction, a number of beam spots is 2~300;

wherein in the single beam spot or the combination of the plurality of beams spots, a shape of the beam spot(s) is circular or elliptic, and a diameter a of the beam spot(s) in the scanning direction is 5 μm to 1 mm, and a diameter b of the beam spot(s) in a direction perpendicular to the scanning direction is 5 μm to 300 μm wherein an average value of spacing $d_m$ between the beam spots of the combination of the plurality of beams spots in the scanning direction is between c/5 and 5c, where c is an average diameter of the beam espots in the scanning direction;

said scanning grooving being carried out through multiple scannings for each groove produced in the scanning grooving, wherein a product of the number of beam spots of the pulse laser and a number of the scannings is 5 or more.

2. The method for manufacturing stress-relief-annealing-resistant, low-iron-loss grain-oriented silicon steel according to claim 1, wherein the scanning grooving is carried out after hot stretching, temper rolling and annealing; after the scanning grooving, the silicon steel sheet is coated with secondary insulating coating(s) on one or both surfaces thereof and is then sintered.

3. The method for manufacturing stress-relief-annealing-resistant, low-iron-loss grain-oriented silicon steel according to claim 1, wherein the wavelength of the pulse laser is 0.3 to 3 μm.

4. The method for manufacturing stress-relief-annealing-resistant, low-iron-loss grain-oriented silicon steel according to claim 1, wherein the grooves formed on the surface(s) of the silicon steel sheet have a depth of 5 to 35 μm and a width of 8 to 310 μm, and wherein deposits on both sides of the grooves have a height of 2.5 μm or less, and the angle between the grooves and the lateral direction of the silicon steel sheet is 45° or less.

5. The method for manufacturing stress-relief-annealing-resistant, low-iron-loss grain-oriented silicon steel according to claim 1, wherein when the single surface of the grain-oriented silicon steel sheet is grooved, the spacing between adjacent grooves in the rolling direction of the silicon steel sheet is 1 to 10 mm; when the both surfaces of the grain-oriented silicon steel sheet are grooved, the spacing between adjacent grooves in the rolling direction of the silicon steel sheet is 2 to 20 mm.

* * * * *